United States Patent
Hayashi et al.

[15] 3,695,023
[45] Oct. 3, 1972

[54] CONTROL APPARATUS FOR FLUID ACTUATOR

[72] Inventors: Yasutaka Hayashi; Hideo Arakawa, both of Nagoya, Japan

[73] Assignees: Kabushiki Kaisha Toyoda Jido Shokki Seisakusho, Kariya-shi; Kabushiki Kaisha Toyota Chuo Kenkyu-sho, Nagoya-shi, Japan

[22] Filed: Oct. 30, 1970

[21] Appl. No.: 85,403

[30] Foreign Application Priority Data

Nov. 7, 1969 Japan ..................... 44/89200

[52] U.S. Cl. ........................... 57/99, 91/219, 91/275
[51] Int. Cl. ........................ D01h 13/06, B65h 54/28
[58] Field of Search ............... 57/93, 94, 98, 99, 156; 242/26.1, 26.2, 26.3, 26.4, 26.5, 43.1; 91/219, 275

[56] References Cited

UNITED STATES PATENTS

| | | | |
|---|---|---|---|
| 2,735,405 | 2/1956 | Hipple | 91/275 |
| 3,365,624 | 1/1968 | Komendera | 91/275 X |
| 3,434,283 | 3/1969 | Piret | 91/275 X |
| 3,188,013 | 6/1965 | Geen | 242/43.1 |
| 3,245,215 | 4/1966 | Graf | 57/99 |
| 3,397,529 | 8/1968 | Wolf | 57/99 X |
| 3,406,919 | 10/1968 | Turk et al. | 242/26.4 |

*Primary Examiner*—Werner H. Schroeder
*Attorney*—Berman, Davidson & Berman

[57] ABSTRACT

A control method and apparatus for a fluid actuator to control the movement of objects, which includes an electro-hydraulic or pneumatic selector valve to regulate the actuator, a pressure fluid reservoir, conduits to connect the actuator to the reservoir through the selector valve, a fluid pump disposed within one of the conduits for supplying pressure fluid from the reservoir to the actuator through the selector valve, limit switches operated by the movement of the objects to energize an electrical control or timing circuit to control operation of the selector valve. Operation of the selector valve functions to switch over the situation of the pressure fluid within the actuator to and from the switched-over-situation and/or the unswitched-over-situation and to hold the two situations respectively for predetermined periods of time, thereby undesired vibrations of industrial devices and machines are eliminated to permit high speed, high pressure and accurate operation of the devices and machines.

10 Claims, 14 Drawing Figures

INVENTORS
YASUTAKA HAYASHI,
HIDEO ARAKAWA,

BY
Berman, Davidson & Berman.
ATTORNEYS.

CONTROL APPARATUS FOR FLUID ACTUATOR

The present invention relates to a control method and apparatus for a fluid actuator, and more particularly to a novel control method and apparatus to eliminate oscillations produced at changeovers of a two-position selector valve, a three-position selector valve, and the like in such pneumatic or hydraulic actuator controlling movements of objects by control of the pressure fluid in a hydraulic cylinder, an air cylinder, a hydraulic swing motor, and the like.

As the fluid to operate such actuators as hydraulic cylinders and air cylinders, media including a fluid in a gas phase such as air or fluid in a liquid phase such as water, oil, and the like. It is, however, understood that gas is not proper to use for precise control of movements of workpieces or parts of machines (called hereinafter simply "object or objects") because of the compressibility of the gas. On the other hand, fluid in liquid phase such as water, oil, or the combination of the two generally in use is adopted for precise control of movements of objects, being practically considered to be incompressible.

The modern improvements in industrial devices and machines for faster and more minute operation have increased the reciprocating speeds of the objects, which has, in turn, increased inertia force on arresting the moving objects. This causes the machines to produce vibratory oscillations during such operations as quick stops, reversing movements, positioning stops at fast forward moves, and so forth. These oscillations prevent the machines from conducting precise control over the operation of minute movements and positioning of the objects. For example, in a textile ring twisting machines, filaments cannot be wound in the right place on packages when the ring rail of the machine comes to the reversing point, and in a machine tool adopted for positioning stops at fast forward moves, no positioning at micron increments is possible.

We have come, in the course of analyzing causes of the oscillations, to a conclusion that it is impossible to isolate the oscillations in the machines operated by media in liquid phase which has heretofor been considered practically incompressible. And further analyses lead to the conclusion that the media in liquid phase such as water, oil or the combination of the two (called "operation liquid" hereinafter), while considered incompressible, precisely speaking, however, perfectly incompressible operation liquid is unobtainable. A very slight amount of gas is inevitably confined within the operation liquid by the viscosity and surface tension of the operation liquid, hence the gas should be considered to give the operation liquid slight compressibility.

Any of the operation liquid now in industrial use has some contact with the atmosphere while it circulates within a machine is charged into and discharged out of the machine; particularly, when it is discharged into a reservoir, it has the greatest contact with the atmosphere. While the operation liquid is in contact with the atmosphere, gas particles are entrained into the operation liquid from the surface thereof. Thus, in many cases, the operation liquid keeps therein gas particles in the amount of from one to four per cent. Therefore, we cannot but recognize that the operation liquid has some compressibility therein even slightly.

This slight compressibility and resilient force the compressibility produces have heretofore caused no problem in industrial production. They have, however, come to be big problems in the modern industrial production, where precision of micron increments is required in controlling movements of the objects and the inertia force of the transmitting objects is much increased in accordance with the higher speed operation of the machines. The present invention takes the slight compressibility into consideration and eliminates slight vibratory oscillations by way of controlling the resilient force produced by the compressibility. The words of "compressibility", "resilient force" and those of the equivalent meaning indicate the compressibility and resilient force caused by the small amount of gas caught in the operation liquid described below.

In the present invention, media in gas phase to operate actuators are treated as one subject in addition to the above described media in liquid phase. It is, however, to be understood that the present invention, of preventing the oscillations caused by the slight compressibility by air caught in the operation liquid, can just as well control the oscillations produced by compressibility due to the media in gas phase like air and so forth. The technical concept of the present invention is not changed by the value of the compressibility of the media.

The most important object of the present invention is, therefore, to provide a control method for a fluid actuator to control movements of objects in a control system, the actuator having at least one cycle of operation comprising the steps of switchingover the flowing direction of the fluid media within the actuator along with the changes of the directions and speeds of the objects, returning the flowing direction of the fluid media to the original direction after the switched over flowing direction of the fluid media is held for a predetermined period of time, and switchingover the flowing direction of the fluid media after the original flowing direction of the fluid media is held for another predetermined period of time, thereby, eliminating oscillations of the objects at the changeover points of the flowing direction of the fluid media in the actuator.

The second important object of the present invention is to provide a control apparatus for a fluid media actuator to control movements of objects in a fluid media control system to change the moving directions and speeds of the objects by switching over the flowing directions of the fluid media, the control apparatus causing the actuator to provide the control system with at least one cycle of operation which includes the steps of switchingover the flowing direction of the fluid media, returning the flowing direction of the fluid media to the original flowing direction after the switched over flowing direction of the fluid media is held for a predetermined period of time, and switching over again the flowing direction of the fluid media after the original flowing direction of the media is held for another predetermined period of time.

The third important object of the present invention is to provide an improved textile ring twisting machine equipped with an embodiment of the above described control apparatus, wherein filament can be wound on packages in the designed style, and when the thread is let out from the packages, it goes out very smoothly without getting tangled and snapped.

The further important object of the present invention is to provide various kinds of industrial devices and machines having fluid media actuators equipped with an embodiment of the above described control apparatus, thereby high speed and/or high pressure operation can easily and accurately be obtained.

The above and still further objects, features and advantages of the present invention will become more apparent upon consideration of the following detailed description, especially when taken in conjunction with the accompanying drawings, wherein:

First, an embodiment of the conventional control method and apparatus for an actuator is described in reference to the figures so as to reveal the problems and inconvenience which make the technical subjects to be solved by the present invention clearer.

Figure 1:
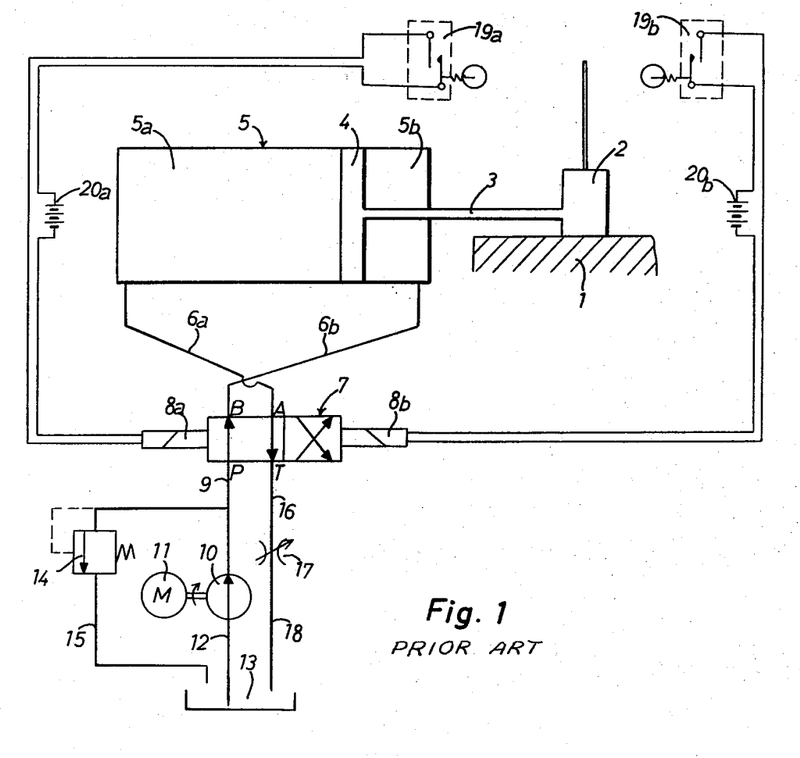
FIG. 1 is a simplified schematic view showing the control method and apparatus of a conventional prior art actuator.

FIG. 1 illustrates a conventional constant-speed control apparatus of a hydraulic cylinder equipped with a well known two-position selector valve. An object 2 is slidably placed on a base 1 and connected to a piston rod 3 of a piston 4 positioned for reciprocation within a hydraulic cylinder 5. The hydraulic cylinder 5 has a cylinder bore forming a chamber 5a and a chamber 5b. The chamber 5a is connected through a conduit 6a to a port A of a four-way two position selector valve 7 (called hereinafter simply "selector valve"). The chamber 5b is connected with a port B of the selector valve 7 by a conduit 6b. The selector valve 7 conducts its switchingover operation by means of solenoids 8a and 8b energized by limit switches 19a and 19b. A port p of the selector valve 7 is connected through a conduit 9 to a hydraulic pump 10 driven by a motor 11. The conduit 9 communicates with a reservoir 13 through a bypass conduit 15 having a relief valve 14 interposed therein. Another port T of the selector valve 7 is connected to the reservoir 13 through a conduit 16, a variable throttle valve 17 and an extension conduit 18. Reference numerals 20a and 20b indicate electrical current sources for the solenoids 8a and 8b.

In a control apparatus of a hydraulic cylinder constructed as mentioned above, when, as illustrated in FIG. 1, constant pressure fluid is charged into the chamber 5b of the hydraulic cylinder 5 and at the same time, fluid within the chamber 5a is discharged into the reservoir 13 through the variable throttle valve 17, the piston 4 moves leftward at a constant speed to transfer, in turn, the object 2 leftward at a constant speed.

Towards the end of the leftward movement, the object 2 engages the limit switch 19a closing the contacts thereof to energize the solenoid 8a of the selector valve 7. The selector valve 7 is thus reversed so that the fluid is now charged into the chamber 5a of the hydraulic cylinder 5 and fluid within the chamber 5b is discharged into the reservoir 13 through the variable throttle valve 17. The object 2 is thus moved oppositely and vibrates due to oscillations produced by the following causes.

Figure 2:
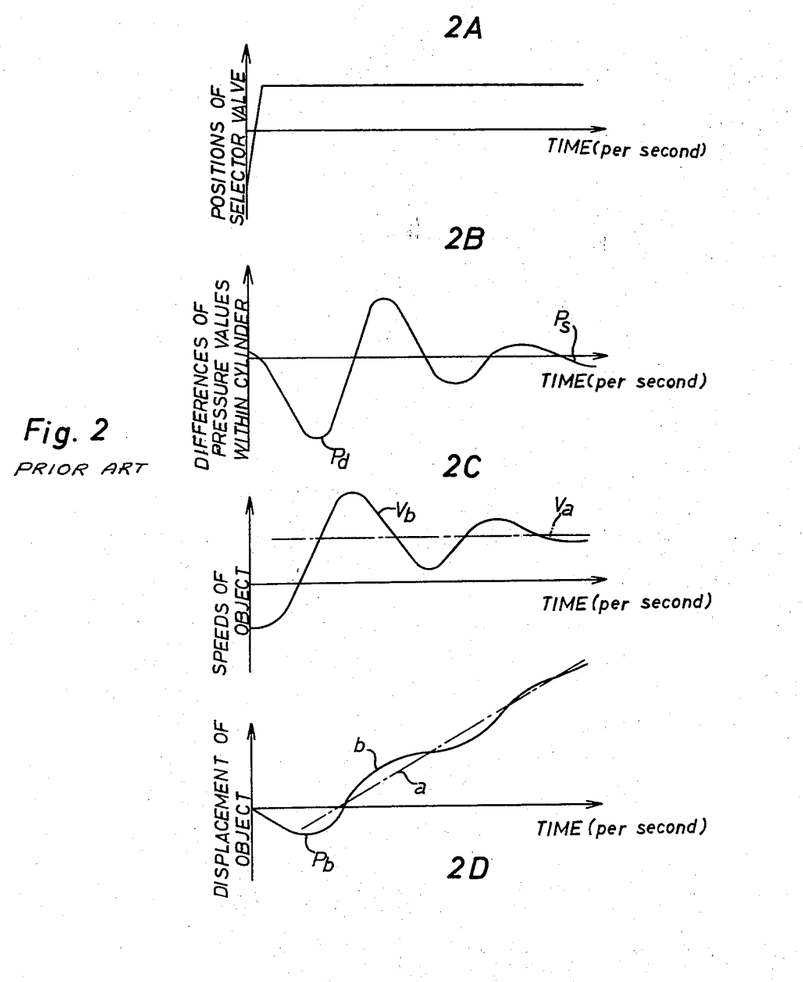
FIG. 2 illustrates functions of the control method and apparatus of the actuator in FIG. 1.

FIG. 2 shows functions of the object 2 at the changeover points of the moving directions, wherein FIG. 2A indicates positions of the selector valve 7 immediately after the changeovers thereof, FIG. 2B shows differences of pressure valves between pressure fluid within the chamber 5a and the chamber 5b of the hydraulic cylinder 5, FIG. 2C tells speeds of the object 2, and FIG. 2D indicates displacement of the object 2. The changes in the above four figures in FIG. 2 are described in the same period of time (per second). As shown in FIG. 2D, when the movement of the object 2 is reversed by changeover of the selector valve 7, leftward inertia force of the object 2 makes the object 2 overrun to a position Pb. The speed of the object 2 becomes zero finally at the overrun position Pb by resilient force of compressed fluid media within the chamber 5a of the hydraulic cylinder 5 in reference to FIG. 2C. At this moment, the moving direction of the object 2 is reversed rightward. The pressure difference between operation fluid within the chambers 5a and 5b of the hydraulic cylinder 5 at this changeover movement is steadily larger than the pressure difference while the piston 4 is in movement; for the former difference, reference is made to a position Pd and for the latter difference, reference is made to a position Ps in FIG. 2B. This accelerates the rightward speed of the piston 4 over the constant one Va. As shown in FIG. 2B, the rightward movement of the piston 4 at a speed over the constant one Va reduces the fluid pressure within the chamber 5a of the hydraulic cylinder 5, but the fluid pressure within the chamber 5b is increased since the variable throttle valve 17 adjusts the amount of fluid media discharged out of the chamber 5b at a fixed value. Thus, as the fluid pressure is being reduced in the chamber 5a and increased in the chamber 5b, the moving speed of the object 2 is reduced from the one over the constant speed Va down to the one less than the constant speed Va in reference to a position Vb in FIG. 2C. Consequently, the displacement of the object 2 is featured as shown in a solid curve b in FIG. 2D, which is oscillating against a dot and dash line a to show desired displacement. This reduces the efficiency of the hydraulic cylinder 5.

The object 2 oscillates mainly by inertia force caused by the leftward movement thereof and by compressive operation of fluid media within the hydraulic cylinder 5 at changeovers of the selector valve 7. The oscillation frequency differs in accordance with changes of the weight of the object 2, the diameter and volume of the hydraulic cylinder 5, the pressure value and compression factor of fluid media within the hydraulic cylinder 5, impedance of fluid occuring during the trip thereof from the conduit 6a or 6b to the reservoir 13, and others.

Described above is in regard to the leftward movement and rightward displacement of the object 2, but it is clear that the same problems take place in the rightward movement and leftward displacement of the object 2.

Some improvements have heretofore been introduced to reduce the above described oscillations in the conventional control apparatus for an actuator, the improvements being to interpose a check valve or an accumulator approximately midway of the conduits 6a and 6b and/or to attach a shock absorber to the piston rod 3. These improvements work to reduce the oscillations of the object 2, but on the other hand, they rise another problem in that the displacement curve of the object 2 is rounded as shown with a double dot and dash curve c in FIG. 3. This curve c has a greater declination from a dot and dash line a which shows ideal displacement of the object 2. A solid curve b indicates displacement of the object 2 when the prior art improvements are not adopted.

The present invention is designed to eliminate at a time both of the oscillations and declinations of the displacement of the object 2 at changeover points of fluid media in a fluid media actuator to control movements of the object 2. The control method and apparatus for an actuator in accordance with the present invention includes such features as, in changing moving directions and speeds of the object 2 by changeovers of flowing directions of the fluid media, the changeovers of the selector valve 7, for instance, a two-position selector valve with switchover position a and b, are used in order that, with reference to FIG. 4, the switchover position is changed to b from a, after a predetermined period of time of $t_1$ second, the position is returned to a from b, and after another predetermined period of time of $t_1 + t_2$ second, the position is again changed to b from a.

Figures 3, 4:
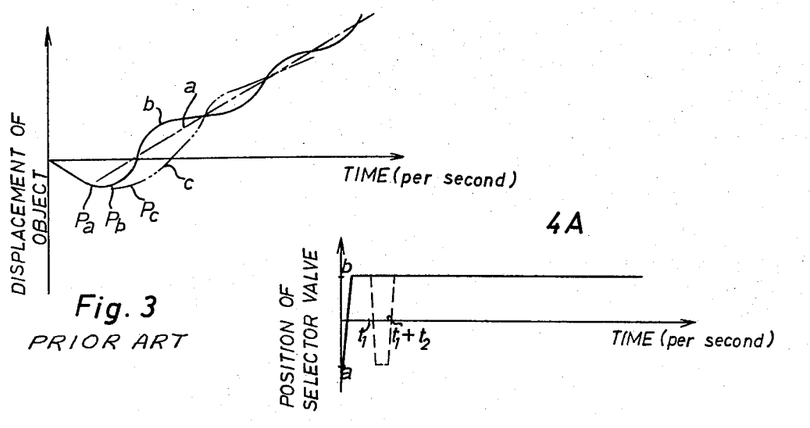
FIG. 3 shows a function of the apparatus in FIG. 1 wherein a conventional prior art improvement is embodied.
FIG. 4 shows comparison of operation between a conventional control apparatus and the control apparatus in accordance with the present invention.
Figures 4, 4B:
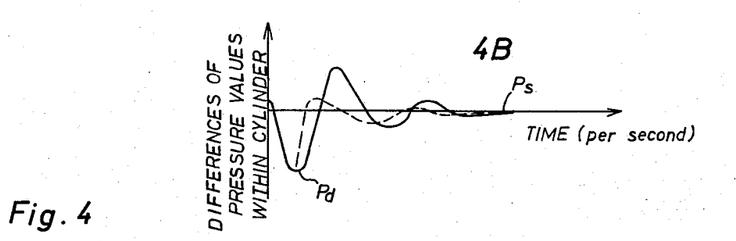
Figure 4:
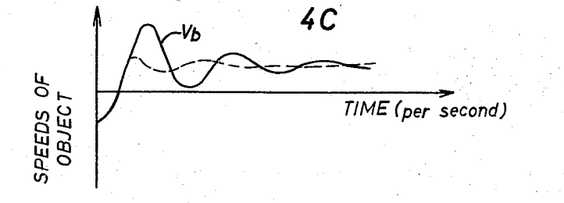

FIG. 4 shows the control method and operation of the apparatus of the present invention in comparison with those in the conventional control system; FIG. 4A shows the changeover position of the selector valve 7 to regulate flowing directions of the fluid media, FIG. 4B indicates pressure differences within the cylinder 5, FIG. 4C indicates the moving speeds of the object 2, and FIG. 4D shows the displacement of the object 2, all the figures in FIG. 4 being illustrated in the same period of time (per second). In the figures, solid curves and lines show operation of the conventional apparatus and broken lines indicate operation of the apparatus in accordance with the present invention.

As can be understood from FIG. 4, when the changeover position of the selector valve 7 is switched over from a to b as shown in FIG. 4A in accordance with the changeover point of the moving direction of the object 2, the object 2 overruns to a position Pb as shown in FIG. 4D by the inertia force thereof. At the position Pb, the object 2 is about to make a reverse movement by resilient force of fluid media compressed in the cylinder 5. At this moment, the changeover position of the selector valve 7 is returned to a from b for the $t_2$ second, which makes the fluid pressure keep the pressure difference small in the cylinder 5 with reference to FIG. 4B. This prevents the object 2 from being accelerated to move at a speed over the constant one Va. Thus, the displacement of the object 2 is made as shown with a broken curve in FIG. 4D, which runs approximately along with the ideal displacement to eliminate the oscillation and declinations of the displacement of the object 2. The switchover time of $t_2$ of the selector valve 7 should be set at a proper period in accordance with control systems concerned, since when too long or short, the anti-oscillation effect is lessened. The period of time for $t_2$ is to be set approximately at a number double that of the natural vibration frequency of the vibration system composed of the object 2 and the compressibility of the fluid media.

Figure 5:
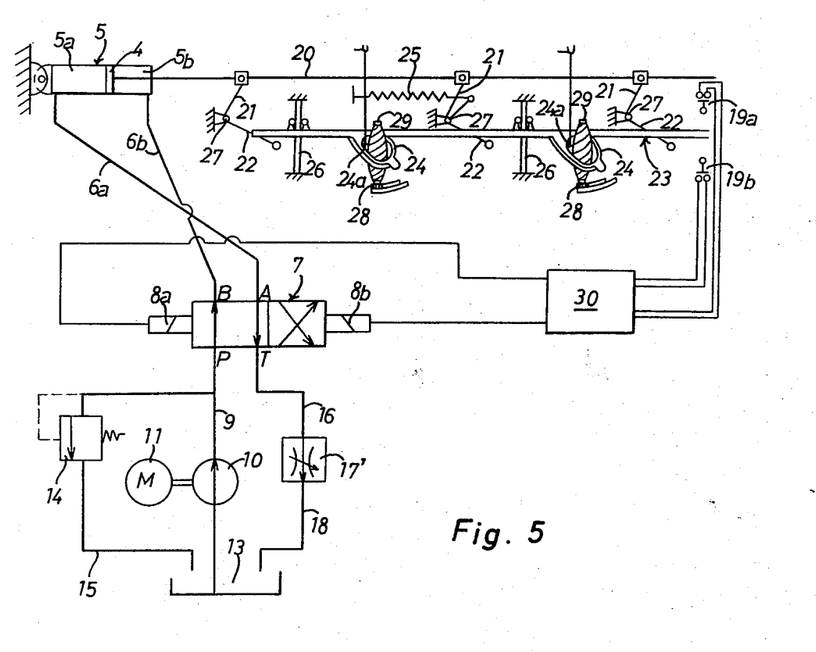
FIG. 5 is a simplified schematic constructional view showing the control method and one embodiment of the apparatus in accordance with the present invention.
Figure 6:
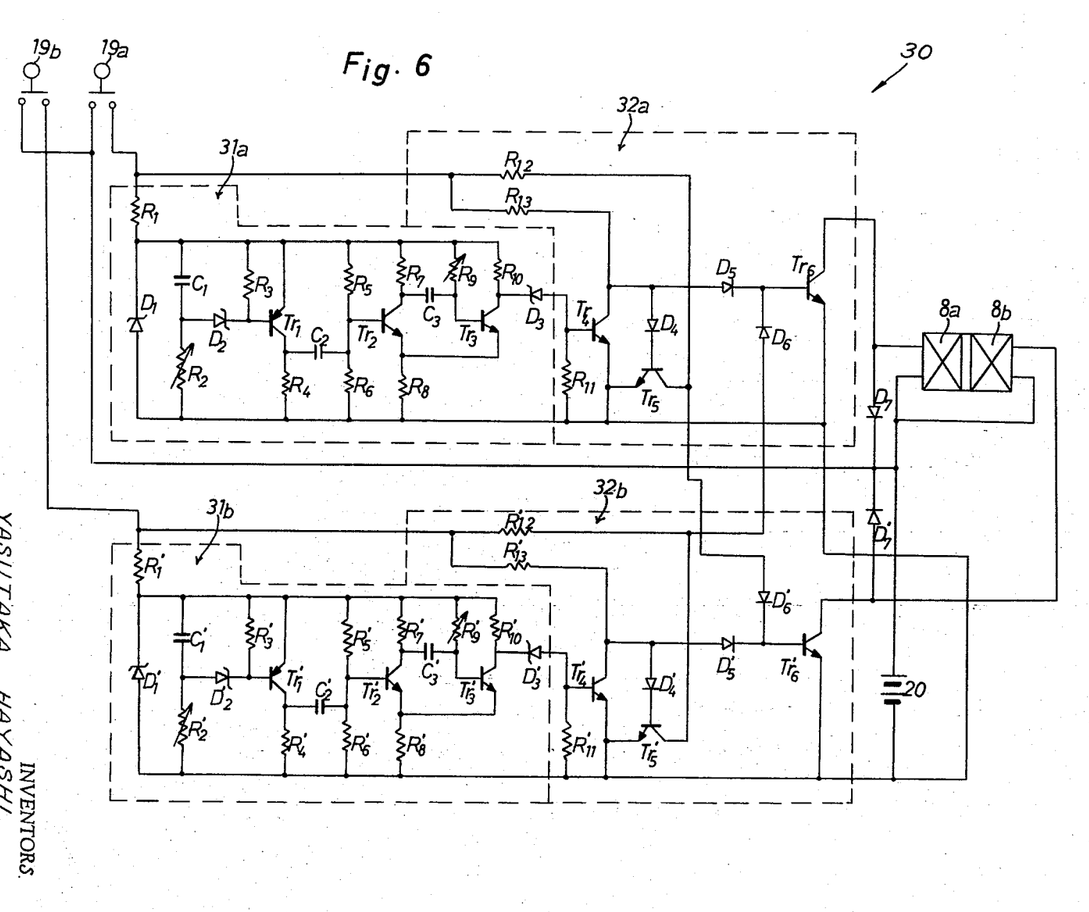
FIG. 6 shows an electrical control circuit for a two-position selector valve in the above embodiment shown in FIG. 5.
Figure 7:
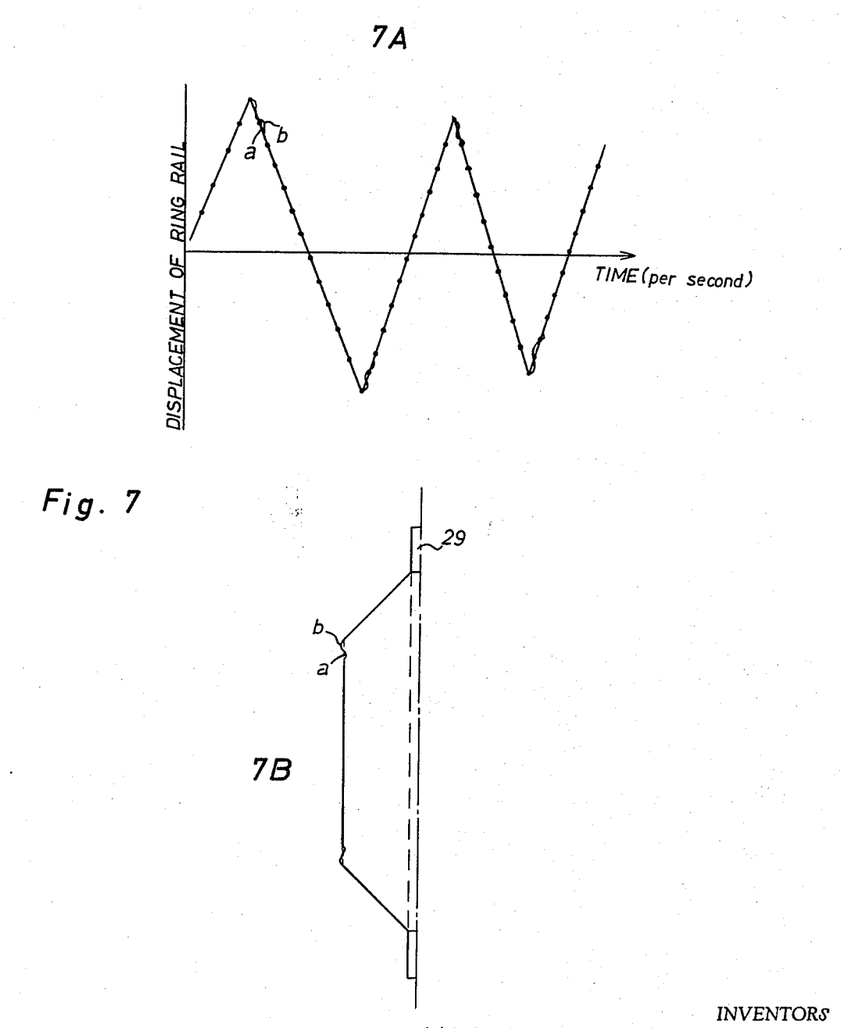
FIG. 7 shows a function of the embodiment shown in FIG. 5.

Now referring to FIG. 5, 6 and 7, a preferred embodiment in accordance with the present invention is described. In FIG. 5 there is described an embodiment of the present invention used on a textile ring twisting machine for preventing oscillations of the ring rail thereof. A connecting rod 20 is connected at the left end thereof with a piston 4 of a hydraulic cylinder 5, being pivoted with drive levers 21-21 journalled swingably on a fixed pivot 27 of the machine. The piston 4 reciprocates within the hydraulic cylinder 5. The chamber 5a of the hydraulic cylinder 5 is connected through a conduit 6a to a port A of a four-way two position selector valve 7 (called hereinafter simply "selector valve") and the chamber 5b is in communication with a port B of the selector valve 7 through a conduit 6b. The selector valve 7 is changedover by solenoids 8a and 8b energized by limit switches 19a and 19b. The solenoids 8a and 8b are energized through an electrical control means 30 described hereinafter in detail. A port P of the selector valve 7 is connected through a conduit 9 to a hydraulic pump 10 driven by a motor 11 to pump fluid media from the reservoir 13 to the valve 7. The conduit 9 is also connected with a bypass conduit 15 having a relief valve 14 interposed therein. The conduit 15 extends to a reservoir 13.

Ring rail levers 22-22 made in a piece with the drive levers 21-21 connected with the connecting rods 20 are installed with a ring rail 23 which moves up and down guided by traverse guide rods 26-26 vertically fixed on the machine. The ring rail 23 is supported by spring 25 stretched on the drive levers 21-21, the right end of the ring rail 23 is positioned so as to engage the limit switches 19a or 19b. Reference numerals 24-24 show ring holders provided on the ring rail 23. The ring holders 24-24 have packages 29-29 vertically installed therein, and filament is wound on the packages 29-29 through travelers 24a-24a.

The electrical control means 30 for the solenoids 8a and 8b of the selector valve 7 is described below in reference to FIG. 6. The electrical control means 30 comprises switching circuits 32a and 32b and delaying pulse circuits 31a and 31b. The switching circuits 32a and 32b, are identical with the reference numerals in 32b being primed. Circuit 32a is described in detail. In switching circuit 32a a transistor $Tr_4$ is in parallel with a transistor $Tr_5$ and a transistor $Tr_6$ respectively through a diode $D_5$ a base grounding resistor $R_{11}$ is connected with the base of the transistor $Tr_4$. In the delaying pulse circuit 31a or 31b, a charging and discharging circuit comprising a condenser $C_1$ in series connection with a variable resistor $R_2$ communicates with the base of a transistor $Tr_1$ through a zener diode $D_2$. The connection of the transistor $Tr_1$ at the collector is made so as to apply the output thereof to an emitter coupled monostable multivibrator and to apply the output of a transistor $Tr_3$ to the base of the transistor $Tr_4$ through a zener diode $D_3$. Reference numeral $D_1$ shows a zener diode for supplying constant voltage in the delaying pulse circuit 31a and reference numeral $D_7$ indicates a diode to suppress the counter spike of the solenoid 8a.

In the textile ring twisting machine of the above mentioned construction, when, as shown in FIG. 5, fluid media of a constant pressure is charged into the chamber 5b and fluid in the chamber 5a is discharged into the reservoir 13 through an a variable throttle valve 17', the piston 4 makes a leftward movement at a constant speed moving the connecting rod 20 leftward at a constant speed. Then, the drive levers 21—21 revolve counterclockwise on the fixed pivots 27 and sequentially the ring rail 23 is pushed upward by the ring rail levers 22—22 raising the winding position of the filament on the packages 29. Toward the end of the upward movement of the ring rail 23, the right edge of the ring rail 23 engages the upper limit switch 19a closing its contacts. At this moment, in the switching circuit 32a of the electrical control means 30, the transistor $Tr_4$ becomes off by effect of the base grounding resistor $R_{11}$ to make the transistors $Tr_5$ and $Tr_6$ become on. This energizes the solenoid 8a to changeover the selector valve 7 leftward. In the delaying pulse circuit 31a, the transistor $Tr_1$ and $Tr_2$ stay off and the transistor $Tr_3$ stays on till the charge to the condenser $C_1$ is completed. The transistor $Tr_6'$ in the switching circuit 32b is kept off. Upon completion of the charge to the condenser $C_1$ in $t_1$ second, for example, in 0.04 second, the transistors $Tr_1$ and $Tr_2$ become on and the transistor $Tr_3$ becomes off. The transistor $Tr_4$ is conducted and the transistors $Tr_5$ and $Tr_6$ become off and the transistor $Tr_6'$ is conducted. This deenergizes the solenoid 8a and energizes the solenoid 8b to return the selector valve 7 rightward.

When $t_2$ second passes, for example, 0.02 second, the charge to the condenser $C_3$ is completed, the condenser $C_3$ being connected to the base of the transistor $Tr_3$. Then, the emitter coupled monostable multivibrator reverses to make the transistors $Tr_5$ and $Tr_6$ become on again which energizes the solenoid 8a to cause a leftward changeover of the selector valve 7. Consequently, the connecting rod 20 together with the piston 4 moves rightward to push down the ring rail 23. The downward movement of the ring rail 23 releases the limit switch 19a to block electrical current supplied to the solenoid 8a, but the solenoid 8a remains in the same position.

When the limit switch 19b is engaged by the downward movement of the ring rail 23, operation of the switch circuit 32b begins and the delaying pulse circuit 31b controls the changeovers of the selector valve 7 in the same way as described above for circuit 32a. The period of time, $t_1$ second, is adjustable by changing variable resistors $R_2$ and $R_2'$ in the delaying pulse circuits 31a and 31b, and the then predetermined period of time, $t_2$ second, is adjustable by changing variable resistors $R_9$ and $R_9'$ of the emitter coupled monostable multivibrator.

Accordingly in the textile ring twisting machine equipped with an embodiment in accordance with the present invention, the upward and downward movements of the ring rail 23 by the repetition of the changeovers of the selector valve 7 leads the displacement of the ring rail 23 as indicated with a dotted solid line $a$ in FIG. 7A of FIG. 7. It is clear in the figure that the ring rail 23 oscillates very little at the changeover points of the movements thereof and has remarkably smaller declinations from the ideal displacement. This enables the filament to be wound on the packages 29 in desirable styles, as shown with a dotted solid line $a$ in FIG. 7B of FIG. 7. A solid line $b$ in FIG. 7A of FIG. 7 shows the situation when the ring rail 23 oscillates at the changeover points. And in this case, the filament wound on the packages 29—29 has irregular portions at the shoulder portions of the packages 29—29. This irregularity creates a tendency to tangle and snap the thread when let out from the packages 29—29.

In the above described embodiment of the present invention, the changeovers of the selector valve 7 are set on three times. However, changeovers above three times can naturally be conducted. Although a constant speed hydraulic control system with a two position selector valve is detailed for better understanding, the control apparatus in the present invention is adoptable to most air or gas operated actuators. In the preferred embodiment, a textile ring twisting machine is detailed to, but the use of the apparatus of the present invention is not restricted to such a machine, and the apparatus is capable of wide usage in the industrial field, for example, for prevention of oscillations of workpiece transfers of a hydraulic automatic grinding machine for positioning the workpieces.

Thus, it will be clear that variations of the details of construction which are illustrated and described may be resorted to without departing from the true spirit and scope of the invention as defined in the appended claims.

What we claim is:

1. In a system for controlling the movement of an object wherein there is provided fluid actuated means for imparting movement to the object, switchable valve means normally in a first state for selectively applying fluid pressure to said fluid actuated means, and means responsive to a predetermined condition of movement of said object for switching said valve means to a second state to apply fluid pressure to said fluid actuated means so as to effect a change in the movement of said object, the improvement comprising:
    a. control means for switching said valve means back to said first state at least once after said predetermined condition of movement has occurred and before said change in movement of said object has occurred.

2. The control system set forth in claim 1 wherein said control means comprises first time-delay means for causing said switchable valve to maintain said second state for a first predetermined period of time after being switched from said first state.

3. The control system set forth in claim 2 wherein said control means further comprises first switching means for switching said valve back to said first state upon termination of said first predetermined period of time.

4. The control system set forth in claim 3 wherein said control means further comprises second time-delay means for causing said switchable valve to maintain said first condition for a second predetermined period of time.

5. The control system set forth in claim 4 wherein said control means comprises second switching means for switching said valve to said second state to cause said valve to apply fluid pressure to said fluid actuated means so as to effect said change in the movement of said object.

6. The control system set forth in claim 5 wherein said fluid actuated means comprises a piston slidably engaged within a cylinder and attached to said object.

7. The control system set forth in claim 6 wherein said means responsive to a predetermined condition comprises detecting means for generating an electrical signal and said switchable valve means comprises means responsive to said electrical signal for switching the state of said valve.

8. The control system set forth in claim 1 wherein said means responsive to a predetermined condition comprises means for changing direction of movement of said object.

9. The control system set forth in claim 1 wherein said means responsive to a predetermined condition comprises means for changing the speed of movement of said object.

10. In a textile ring twisting machine including a ring rail, a plurality of spindles, an electro-hydraulic control means for moving said ring rail between first and second positions with respect to said spindles, said electro-hydraulic control means comprising a cylinder, a piston reciprocable within said cylinder, a piston rod connected with said piston for transmitting motion to said ring rail, a first conduit on one side of said piston and a second conduit on the other side of said piston, switchable valve means having a first solenoid means for switching said valve to a first state and second solenoid means for switching said valve to a second state, a fluid supply reservoir, a fluid pump to supply pressurized fluid to said cylinder from said reservoir through said switchable valve means, said pressurized fluid being supplied to said cylinder on the first side of said piston when said valve means is in said first state and to said cylinder on the second side of said piston when said valve means is in said second state, a first limit switch operable when said ring rail attains said first position for energizing said first solenoid and a second limit switch operable when said ring rail attains said second position for energizing said second solenoid, the improvement comprising:

a. electrical control means connected between said limit switches and said solenoids for controlling operation of said switchable valve means, said electrical control means comprising:
1. a first time-delay circuit for causing said switchable valve means to maintain said second state for a first predetermined period of time after being switched from said first state;
2. first switching means for switching said valve back to said first state upon termination of said first predetermined period of time;
3. second time-delay means for causing said switchable valve to maintain said first condition for a second predetermined period of time; and
4. second switching means for switching said valve to said second state to cause said valve to apply pressurized fluid to the side of said piston which will effect a change in direction of movement of said ring rail;

whereby vibratory oscillations of said ring rail and said plurality of spindles at points where said ring rail changes its direction of travel are eliminated.

* * * * *